(12) United States Patent
Sato

(10) Patent No.: US 12,249,441 B2
(45) Date of Patent: Mar. 11, 2025

(54) TRANSMISSION LINE

(71) Applicant: JUNKOSHA INC., Ibaraki (JP)

(72) Inventor: Ryo Sato, Ibaraki (JP)

(73) Assignee: JUNKOSHA INC., Ibaraki (JP)

( * ) Notice: Subject to any disclaimer, the term of this patent is extended or adjusted under 35 U.S.C. 154(b) by 0 days.

(21) Appl. No.: 18/277,478

(22) PCT Filed: Feb. 22, 2022

(86) PCT No.: PCT/JP2022/007311
§ 371 (c)(1),
(2) Date: Aug. 16, 2023

(87) PCT Pub. No.: WO2022/181623
PCT Pub. Date: Sep. 1, 2022

(65) Prior Publication Data
US 2024/0153670 A1 May 9, 2024

(30) Foreign Application Priority Data
Feb. 25, 2021 (JP) ................................. 2021-029194

(51) Int. Cl.
*H01B 7/02* (2006.01)
*H01B 3/00* (2006.01)
*H01B 3/44* (2006.01)

(52) U.S. Cl.
CPC ........... *H01B 7/0216* (2013.01); *H01B 3/006* (2013.01); *H01B 3/443* (2013.01)

(58) Field of Classification Search
CPC ........ H01B 3/006; H01B 3/443; H01B 3/427; H01B 7/02; H01B 7/0216; C08L 27/18; C08L 2203/202

(Continued)

(56) References Cited

U.S. PATENT DOCUMENTS 4,621,381 A * 11/1986 Schramek .............. A47C 4/028
297/440.13
6,335,490 B1 * 1/2002 Higashikubo ............ C08J 9/122
174/110 F (Continued)

FOREIGN PATENT DOCUMENTS

JP 2005-206745 A 8/2005
JP 2008-174752 A 7/2008

(Continued)

OTHER PUBLICATIONS

May 17, 2022, International Search Report issued for related PCT Application No. PCT/JP2022/007311.

(Continued)

*Primary Examiner* — William H. Mayo, III
(74) *Attorney, Agent, or Firm* — Paratus Law Group, PLLC

(57) ABSTRACT

A transmission line including a conductor and a dielectric layer, wherein the dielectric layer includes plural bubbles and plural acicular nucleating agents, and when, based on observed lengths of the plurality of acicular nucleating agents observed in a cross section of the dielectric layer, the nucleating agents having lengths longer than a median value of the observed lengths are classified into a long nucleating agent group and the nucleating agents having lengths shorter than the median value of the observed lengths are classified into a short nucleating agent group, an average length of the nucleating agents in the long nucleating agent group is 3.5 times or less an average length of the nucleating agents in the short nucleating agent group.

10 Claims, 4 Drawing Sheets

(58) Field of Classification Search
USPC ........ 174/110–121 SC, 102 R–109; 428/375; 521/91, 92
See application file for complete search history.

(56) References Cited

U.S. PATENT DOCUMENTS

| | | |
|---|---|---|
| 2004/0198886 A1 | 10/2004 | Shiotsuki et al. |
| 2007/0149671 A1 | 6/2007 | Shiotsuki et al. |
| 2008/0087454 A1* | 4/2008 | Ohno ..................... C08J 9/0066 521/91 |
| 2023/0260672 A1* | 8/2023 | Maruhashi ............. H01B 3/427 428/372 |

FOREIGN PATENT DOCUMENTS

| | | |
|---|---|---|
| JP | 2010-212185 A | 9/2010 |
| JP | 2010-215796 A | 9/2010 |

OTHER PUBLICATIONS

May 17, 2022, International Search Opinion issued for related PCT Application No. PCT/JP2022/007311.

* cited by examiner

TRANSMISSION LINE

CROSS REFERENCE TO PRIOR APPLICATION

This application is a National Stage Patent Application of PCT International Patent Application No. PCT/JP2022/007311 (filed on Feb. 22, 2022) under 35 U.S.C. § 371, which claims priority to Japanese Patent Application No. 2021-029194 (filed on Feb. 25, 2021), which are all hereby incorporated by reference in their entirety.

TECHNICAL FIELD

The present disclosure relates to a transmission line including a dielectric layer. In particular, the present disclosure relates to a transmission line including a dielectric layer having bubbles and a conductor, the conductor serving as a transmission path for an electrical signal.

BACKGROUND ART

A foamed dielectric containing bubbles in a resin can achieve a dielectric constant lower than a dielectric constant unique to the resin, and thus is useful as a dielectric of a transmission path for a high-frequency electrical signal. For example, by using such a foamed dielectric as an insulating layer formed between a central conductor and an outer conductor of a coaxial cable, it is possible to obtain a cable with small electrical signal attenuation and an excellent transmission characteristic.

In such an application, attempts have been made to improve the transmission characteristic of the transmission line by controlling a foamed state of the foamed dielectric. For example, bubbles in a foam are required to be fine or uniformly distributed. An additive called a nucleating agent can be used to form such a foam.

JP2008-174752A discloses a resin composition containing a fluororesin and boron nitride, in which the boron nitride has a d99 of 15 μm or less. As a result, a foam in which finer bubbles are uniformly distributed is provided. In this disclosure, a nucleating agent for foaming functions as a starting point for generating bubbles during foam molding.

JP2005-206745A discloses a foamable composition containing a fluororesin and an electrically insulating whisker, a foam obtained by foaming the same, and a coaxial insulated cable having a foam layer containing a fluororesin as an insulator. It has been found that by using the beard-like insulating whisker, it is possible to form fine bubbles with a high foaming rate.

PRIOR ART DOCUMENTS

Patent Literatures

Patent Literature 1: JP2008-174752A
Patent Literature 2: JP2005-206745A

SUMMARY OF INVENTION

Object to be Achieved by the Invention

However, the foaming composition described in these patent literatures and the transmission line to which the foaming composition is applied as a dielectric layer still have room for improvement in terms of a bubble shape and the transmission characteristic.

The present invention provides a transmission line having an excellent transmission characteristic, and including a foamed dielectric layer having an excellent bubble shape.

Means for Achieving the Object

In order to achieve the object described above, the configurations described in the claims can be adopted. For example, there is provided a transmission line including a conductor and a dielectric layer, in which the dielectric layer includes a plurality of bubbles and a plurality of acicular nucleating agents, and when, based on observed lengths of the plurality of acicular nucleating agents observed in a cross section of the dielectric layer, the acicular nucleating agents having lengths longer than a median value of the observed lengths are classified into a long nucleating agent group and the acicular nucleating agents having lengths shorter than the median value of the observed lengths are classified into a short nucleating agent group, an average length of the acicular nucleating agents in the long nucleating agent group is 3.5 times or less an average length of the acicular nucleating agents in the short nucleating agent group.

EMBODIMENTS FOR CARRYING OUT THE INVENTION

Hereinafter, embodiments (or examples) of the present disclosure will be described in detail with reference to the drawings. The embodiments described below do not limit the inventions according to the claims, and all combinations of features described in the embodiment are not necessarily essential for the solution means of the invention. In addition, the respective embodiments in the respective examples may be freely combined without losing the technical significance of the invention.

First Embodiment

In a first embodiment of the present disclosure, a dielectric layer of a transmission line includes a plurality of acicular nucleating agents, and a group consisting of acicular nucleating agents having a longer length among the acicular nucleating agents has a shorter average length than a group consisting of acicular nucleating agents having a shorter length.

Thus, there is provided a transmission line including a conductor and a dielectric layer, in which the dielectric layer includes a plurality of bubbles and a plurality of acicular nucleating agents, and when, based on observed lengths of the plurality of acicular nucleating agents observed in a cross section of the dielectric layer, a group consisting of the acicular nucleating agents having lengths longer than a median value of the observed lengths is classified as a long nucleating agent group and a group consisting of the acicular nucleating agents having lengths shorter than the median value of the observed lengths is classified as a short nucleating agent group, an average length of the acicular nucleating agents in the long nucleating agent group is 3.5 times or less an average length of the acicular nucleating agents in the short nucleating agent group. Accordingly, a transmission line having an excellent transmission characteristic can be obtained.

Figure 1:
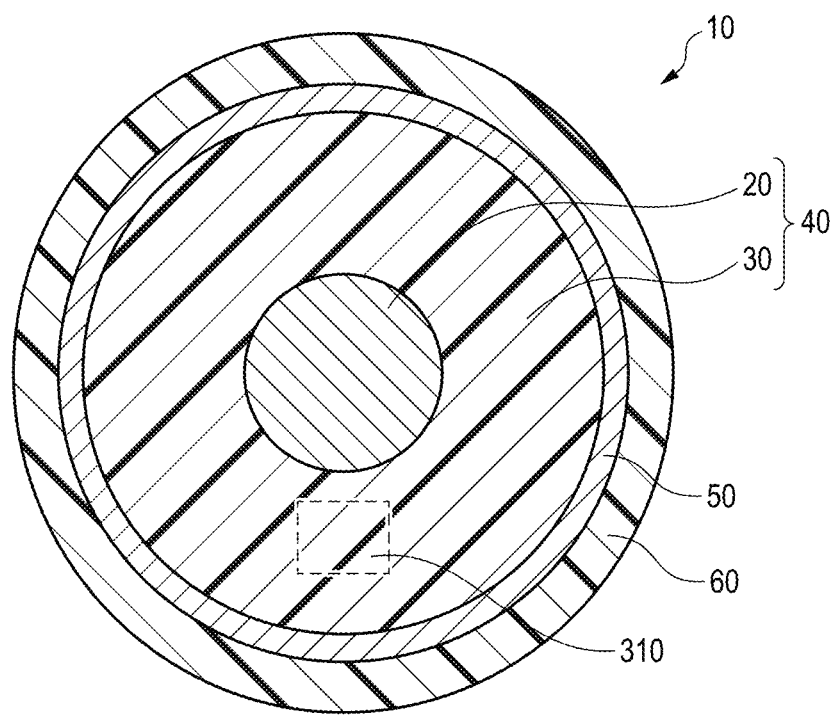
FIG. 1 is an example of a cross-sectional view illustrating a transmission line 10 according to a first embodiment of the present disclosure.

FIG. 1 is an example of a cross-sectional view illustrating a transmission line 10 according to the first embodiment of the present disclosure. A signal transmission direction of the transmission line illustrated in this figure is a direction perpendicular to a paper surface, that is, this figure illustrates a cross section of the transmission line on a plane orthogonal to a longitudinal direction of the cable-like transmission line.

The transmission line 10 includes a core 40 including a central conductor 20 and a dielectric layer 30 formed around the central conductor 20. As the central conductor 20, for example, a thin metal wire containing a low-resistance metal such as silver or copper can be used. The dielectric layer 30 is made from an insulating material such as a resin, and is configured as a layer having a low dielectric constant by containing a large number of fine bubbles (not illustrated) therein.

The transmission line 10 may further include a coating layer formed around the core 40. In this figure, the transmission line 10 has a coaxial cable structure including an outer conductor 50 formed around the core 40 and an outer sheath 60 formed around the outer conductor 50.

Figure 2:
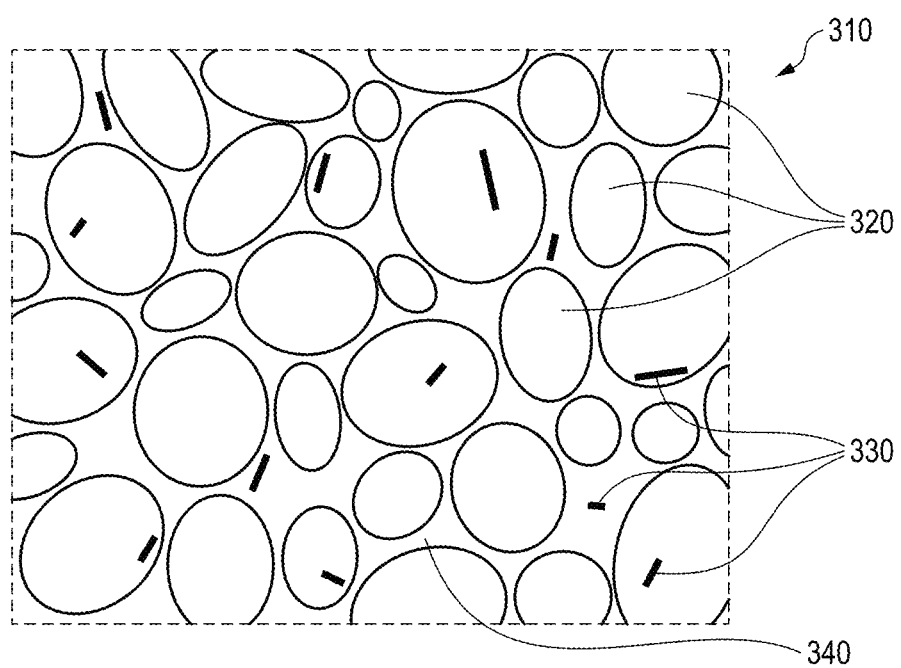
FIG. 2 is a conceptual diagram illustrating details of a dielectric layer 30 of the transmission line 10.

FIG. 2 is a conceptual diagram illustrating details of the dielectric layer 30 of the transmission line 10. For example, a region 310 indicated by a broken line in FIG. 1 is illustrated.

The dielectric layer 30 includes a plurality of bubbles 320 formed in a resin layer 340. For simplification, in this figure, the bubbles are illustrated as spherical and spheroidal bubbles each having a circular cross section and an elliptical cross section independently of each other. However, the bubbles may have a shape in which a part of the bubbles is connected to the adjacent bubbles, or may have a distorted shape. From a viewpoint of mechanical characteristic, it is considered preferable that a cross-sectional shape of the bubble is as close to circular as possible. On the other hand, a dielectric of the transmission line has an advantage in that the dielectric constant can be reduced by increasing a ratio of the bubbles in the dielectric layer. Therefore, it is preferable to increase the ratio of the bubbles until a resin layer between a certain bubble and an adjacent bubble is stretched into a film shape and a region having a shape extending in a planar manner with a substantially constant thickness is generated at a plurality of positions.

Further, the dielectric layer 30 contains a plurality of acicular nucleating agents 330. In this regard, the acicular nucleating agent refers to a fine acicular substance made from an insulating material having an aspect ratio of 3 or more, preferably 6 or more. The aspect ratio is a value obtained by dividing a length of the acicular nucleating agent in an extending direction, that is, a length of the acicular nucleating agent in a longitudinal direction by a diameter (or width), and can be measured, for example, in a state of placing the acicular nucleating agent on a sample table, by setting a size of the acicular nucleating agent in the extending direction placed on a sample stage as the length and a size of the acicular nucleating agent in a direction perpendicular to the extending direction as the diameter. The acicular nucleating agent used for the dielectric layer of the transmission line needs to be fine in order to limit an increase in the dielectric constant of the dielectric layer. Specifically, the diameter is preferably 0.1 micrometers ($\mu$m) or more and 10 $\mu$m or less, more preferably 0.1 $\mu$m or more and 3 $\mu$m or less, and particularly preferably 0.1 $\mu$m or more and 1 $\mu$m or less. As a material of the acicular nucleating agent, for example, an electrically insulating whisker disclosed in Patent Literature 2 can be used.

The acicular nucleating agent 330 is preferably uniformly dispersed in the resin layer 340. A direction and a distribution position of the acicular nucleating agent may not have clear regularity. However, a length distribution of each acicular nucleating agent of the transmission line 10 in the present embodiment has a feature described later.

Thus, when the length of the acicular nucleating agent observed in the cross section of the dielectric layer of the transmission line 10 is defined as the observed length, and the acicular nucleating agents having lengths longer than the median value of the lengths are classified into the long nucleating agent group and the acicular nucleating agents having lengths shorter than the median value of the lengths are classified into the short nucleating agent group, the average length of the acicular nucleating agents in the long nucleating agent group is 3.5 times or less the average length of the acicular nucleating agents in the short nucleating agent group. The transmission line 10 having such feature can obtain an excellent transmission characteristic.

Further, from a viewpoint of obtaining more stable and excellent transmission characteristic, this magnification, that is, the value obtained by dividing the average length of the acicular nucleating agents in the long nucleating agent group by the average length of the acicular nucleating agents in the short nucleating agent group is more preferably 3 or less, and particularly preferably 2.7 or less.

Here, the observed length is, for example, a length obtained by observing a cross section of a dielectric with a scanning electron microscope (SEM) or the like. The observed length is preferably a length in an extending direction on each image of a plurality of acicular nucleating agents measured in the obtained electron microscope image of the cross section. An observation direction and an actual extending direction of the acicular nucleating agent are not always in a perpendicular relation. Further, since a part of an entire length of the acicular nucleating agent may not be seen due to shadow of the resin or other nucleating agent, the observed length is smaller than an actual length of the acicular nucleating agent in most cases.

The median value is a numerical value located at a center when numerical values of the observed lengths of the nucleating agents are arranged in order of size. When the number of data is an even number, an average value of two numerical values located in the center can be applied.

The transmission line 10 having the feature described above is a mechanism that achieves an excellent transmission characteristic, and although not limited thereto, contribution of the mechanism described later is estimated.

The inventor of the present application has conducted comparisons between prototype levels in which materials such as various nucleating agents and resins, or conditions such as manufacturing conditions of transmission lines are changed. Through these evaluations, the inventor of the present application has confirmed that the acicular nucleating agent can provide a transmission line having an excellent transmission characteristic, and found that there is a difference in smallness of the dielectric constant and stability thereof even when the transmission lines to which the acicular nucleating agent is applied are compared.

In examining this, first, an action of the acicular nucleating agent during forming bubbles in the dielectric layer was examined. In general, a surface of the nucleating agent in the resin layer is considered to be a starting point of bubble generation. Dispersion of the nucleating agent in the resin makes it possible to simultaneously and repeatedly generate the starting point of bubble generation in the resin layer, and as a result, a foam containing bubbles that have a small variation in diameter and that are widely and uniformly dispersed can be obtained. Examining a shape of the nucleating agent from this viewpoint, it is examined that an acicular nucleating agent having a large aspect ratio acts more effectively than a granular nucleating agent having an aspect ratio close to 1. Thus, even if weights of respective nucleating agents are the same, a surface area of the nucleating agent can be increased, so that a region serving as the starting point of bubble generation can be enlarged. Further, for example, in a case in which the nucleating agents having the same mass and the same number are distributed in a resin having a constant volume, the nucleating agent having a high aspect ratio can increase a region close to the nucleating agent in the resin layer.

It is considered that application of the acicular nucleating agent having a predetermined aspect ratio capable of increasing an area per unit weight or an existence range of an additive in the transmission line in which the dielectric constant deteriorates when an addition amount is simply increased is a great advantage.

Figure 3:
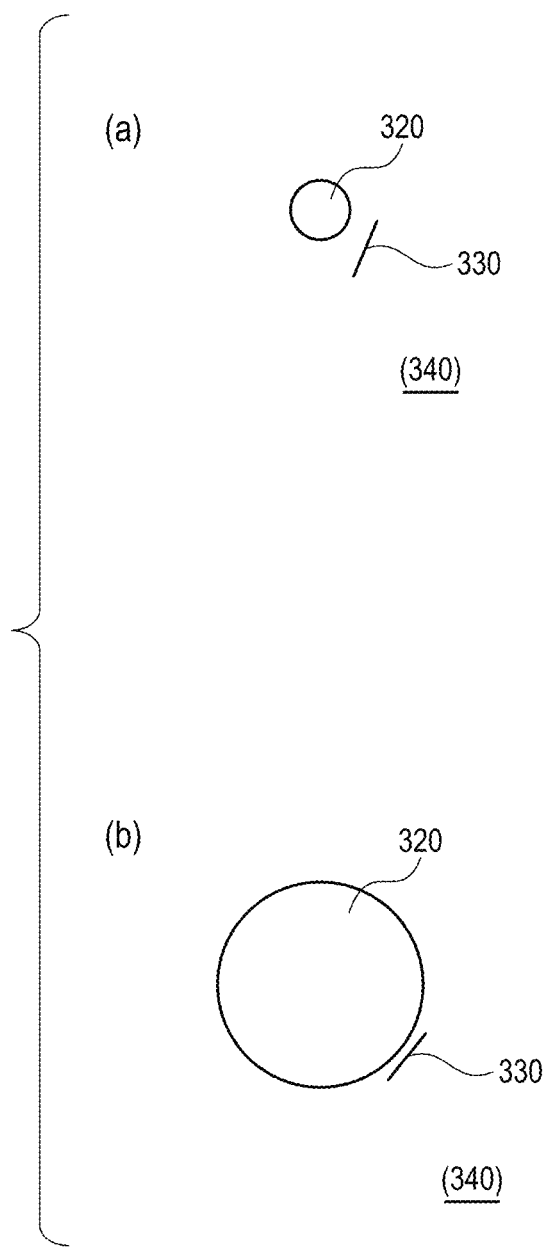
FIG. 3 is a diagram conceptually illustrating an action of an acicular nucleating agent during bubble growth.

The inventor of the present application examined that the acicular nucleating agent has a favorable action even in a bubble growth stage in addition to the above bubble generation stage. FIG. 3 is a view conceptually illustrating the action of the acicular nucleating agent during bubble growth. (a) of FIG. 3 illustrates a state immediately after the generation of a bubble, and (b) of FIG. 3 illustrates a state in which a bubble has grown over a short period of time. The resin layer (340) is a resin layer in a molten state during bubble generation and bubble growth in a manufacturing process of the transmission line 10 (for example, a foamed resin layer forming process described later). The resin layer (340) is the resin layer 340 in the transmission line 10 when it is cooled and solidified.

A bubble 320 and an acicular nucleating agent 330 are present in the molten resin layer (340). In addition to the illustrated acicular nucleating agent 330, there may be an acicular nucleating agent serving as a starting point of the bubble 320, but the illustration is omitted here. At the stage in (a) of FIG. 3, the bubble 320 and the illustrated acicular nucleating agent 330 are separated from each other to some extent, and the acicular nucleating agent 330 does not greatly affect the growth of the bubble 320. When the bubble 320 grows over time, the bubble 320 eventually comes into contact with the acicular nucleating agent 330 directly or via a thin resin film. As illustrated in (b) of FIG. 3, even after the contact, the bubble 320 further grows with rotation and movement of the acicular nucleating agent 330. However, since the bubble 320 needs to accompany the movement of the acicular nucleating agent, the growth of the bubble 320 is limited as compared with a case in which the acicular nucleating agent 330 is not present. Since a bubble that grows and enlarges earlier than other bubbles has a higher probability of contact with the acicular nucleating agent, the growth of such a bubble that grows earlier is easily limited, and as a result, a difference in size between bubbles can be reduced. At this time, since the acicular nucleating agent is present over a longer distance than the granular nucleating agent, it is easy to increase the probability of contact with the bubbles. Further, since resistance to rotation and movement after contact also increases, it is considered that an effect of limiting the growth of the bubble that grows earlier is also significantly increased.

Further, in particular, when the acicular nucleating agent is disposed along the resin film between the bubbles, a mechanical strength of the resin film between the bubbles increases, and thus an effect of limiting coalescence of the bubbles due to film breakage is also expected.

Figure 4:
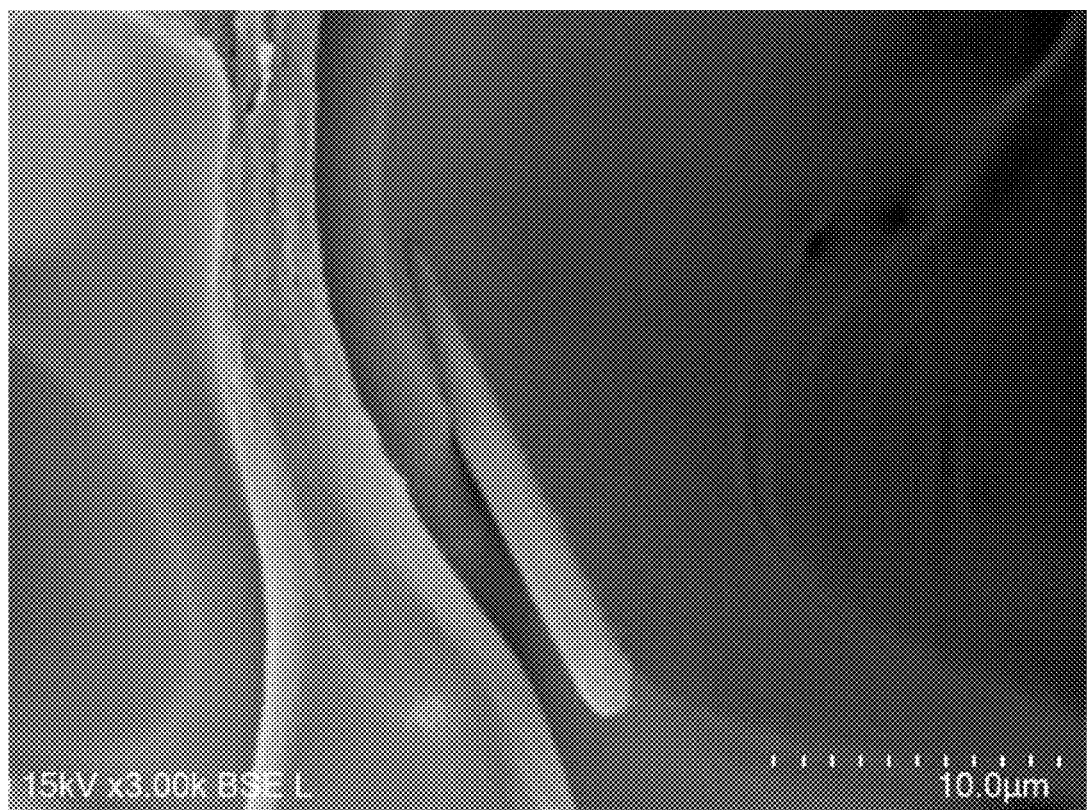
FIG. 4 is an electron microscopy image of the acicular nucleating agent that intersects with a bubble interface.

Incidentally, the inventor of the present application has noticed the presence of the acicular nucleating agent fixed in the resin in a unique state through observation of evaluation samples. In electron microscope observation, most of the acicular nucleating agents are observed at an angle along a film of the resin layer or an inner surface of the bubble. However, it has been found that, although a frequency is low, an acicular nucleating agent in a form in which a part of the entire length is embedded in the resin layer and the remaining part is protruded to the inner surface of the bubble, that is, an acicular nucleating agent that intersects with a bubble interface is present. FIG. 4 is an electron microscopy image of the acicular nucleating agent that intersects with the bubble interface. In this figure, a rod-like material which is observed near a center of the image and extends in a vertical direction of a paper surface in a slightly inclined state is the acicular nucleating agent. It can be seen that a part of the acicular nucleating agent located at upper left of the paper surface is embedded in the resin layer, and the remaining part protrudes into a space inside the bubble.

When the acicular nucleating agent intersects with the bubble interface in this manner, a region of the acicular nucleating agent protruding into the bubble greatly reduces the contribution to the effect of limiting the growth of the bubble described above. As a result, when the variation in the bubble diameter is large, a difference in dielectric constant between regions in the transmission line may be large, or the transmission characteristic may deteriorate. Further, at least the acicular nucleating agent in the region protruding into the bubble does not particularly contribute to the improvement of the transmission characteristic and the improvement of mechanical characteristic, but the presence thereof increases the dielectric constant. Therefore, it is preferable to limit generation of the acicular nucleating agent that intersects with the bubble interface. In studying this limitation method, it was examined in what form an intersection between the acicular nucleating agent and the bubble interface occurred.

Figure 5:
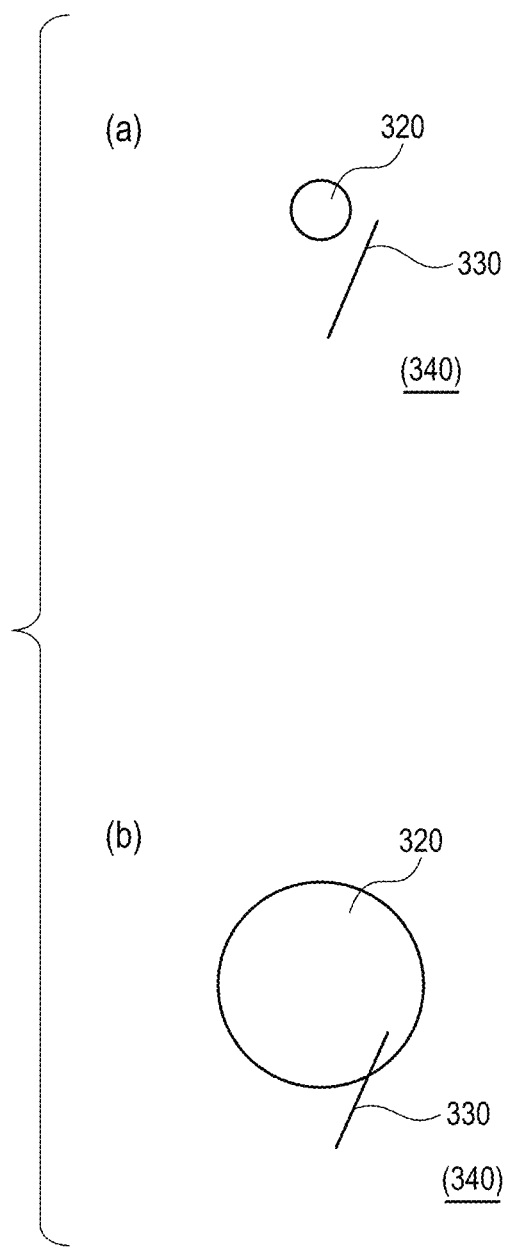
FIG. 5 is a diagram illustrating a process of forming the acicular nucleating agent that intersects with the bubble interface.

FIG. 5 is a diagram illustrating a process of forming the acicular nucleating agent that intersects with the bubble interface. As in FIG. 3, in the molten resin layer (340), the bubble 320 in a growth process and the acicular nucleating agent 330 are illustrated. (a) of FIG. 5 illustrates a state in which the bubble 320 and the acicular nucleating agent 330 are separated from each other, and at a stage in (b) of FIG. 5, a state is illustrated in which the growth of bubbles has further progressed after coming into contact with the acicular nucleating agent with the growth of the bubble. FIG. 5 is different from FIG. 3 in that a length of the acicular nucleating agent 330 is long, and as a result of the growth of the bubble 320, the acicular nucleating agent intersects with the bubble interface. As in FIG. 3, the growing bubble tends to rotate or move the acicular nucleating agent after the interface of the bubble comes into contact with the acicular nucleating agent. However, even in a molten state, in a molten resin having a relatively high viscosity, a longer acicular nucleating agent is more strongly fixed in the resin. As a result, it was considered that in a case of the long acicular nucleating agent, a pressure due to the bubble is likely to exceed a strength of the resin film at a contact position between the bubble and the acicular nucleating agent, and the resin film is likely to break through.

Thus, the effect unique to the acicular nucleating agent of limiting the growth of the bubble that grows earlier is obtained from a characteristic shape of the acicular nucleating agent that has a large length in the longitudinal direction (or aspect ratio), but if the length in the longitudinal direction is excessively large, a phenomenon in which the acicular nucleating agent breaks through the bubble interface is likely to occur, and the unique effect decreases.

In response to this, the transmission line according to the present embodiment is controlled such that the length of the acicular nucleating agent has a predetermined distribution. More specifically, a ratio of the average length of the short acicular nucleating agent group to the average length of the long acicular nucleating agent group is limited to a certain value or less. Accordingly, a bubble control effect unique to the acicular nucleating agent can be achieved at a high level, and occurrence of a decrease in the control effect due to the intersection of the acicular nucleating agent with the bubble interface can be relatively reduced.

The generation of the acicular nucleating agent that intersects with the bubble interface does not need to be completely zero, and the acicular nucleating agent may coexist with the acicular nucleating agent extending along the interface. In particular, it is difficult to completely reduce the generation to zero in a resin such as a fluororesin which is difficult to ensure wettability to a nucleating agent material. Rather, it is understood that such a material in which wettability is hardly secured can be regarded as being in a state in which an intersection with the interface is likely to occur, and a large improvement effect can be achieved by limiting the number of generated acicular nucleating agents that intersects with the interface by the configuration of controlling the length distribution of the acicular nucleating agent.

(Method for Manufacturing Transmission Line 10)

Next, a method for manufacturing the transmission line according to the present embodiment will be described. First, an acicular nucleating agent is prepared. The acicular nucleating agent is preferably made from an insulating material having a small influence on an electrical characteristic of the transmission line. Examples of such material include a metal compound and a ceramic material. In order to obtain an acicular nucleating agent having a predetermined length distribution, it may be possible to form an acicular nucleating agent from a granular material made from these materials. However, it is preferable to prepare a fibrous material having a high aspect ratio and perform appropriate processing on the material to adjust the material to a predetermined length distribution. For example, for potassium titanate and aluminum borate, fibrous or acicular materials are commercially available for purposes of reinforcing plastics and adjusting wear of brakes, and thus utilization of such commercially available materials is studied. However, in order to increase the effect of the fibrous material used for strengthening these mechanical characteristics, many fiber materials having a large aspect ratio are included in many cases. Therefore, in order to obtain the length distribution of the acicular nucleating agent capable of achieving excellent characteristics in the dielectric layer of the transmission line, it is necessary to adjust the length distribution by applying an appropriate mechanical stress to such fibrous material.

As a method for adjusting such length distribution, machining in which a shearing stress is applied to the acicular nucleating agent can be applied. Examples thereof include processing with a stirrer, a Henschel mixer, a tumbler, and a mill.

These methods may be applied to release aggregation or improve dispersibility of materials, and when these methods are applied as methods to release aggregation of fibrous or acicular nucleating agents, there is a possibility that a part of the nucleating agents, particularly a nucleating agent having a long length, is broken, and thus the length distribution is also changed. However, in order to obtain a predetermined length distribution, it is necessary to apply a large external stress as compared with a case in which the aggregation is simply released. For example, in Comparative Example 1 described later, in the electron microscope observation, the aggregation was released to an extent that the aggregated nucleating agent was hardly observed, the nucleating agents were in a uniformly dispersed state, and the average length of the long nucleating agent group was significantly longer compared with the average length of the short nucleating agent group. This is considered to be because each of the above materials is fine and has a high hardness, and thus is not easily broken unless machining energy suitable for the material is applied, and each nucleating agent is often surface modified to limit aggregation, and this is also affected.

Hereinafter, a method for controlling the length distribution of the acicular nucleating agent will be described in more detail. First, a fibrous material having a certain aspect ratio is prepared. For example, a commercially available material containing a large amount of fibrous materials having a diameter of less than 3 μm and a length of 10 μm or more can be used. Many of these materials contain a certain amount or more of individuals that are too long to be applied to the acicular nucleating agent in the dielectric layer of the transmission line, but the length can be adjusted by applying external mechanical stress and breaking these individuals.

However, in particular, when, based on observed lengths of the plurality of acicular nucleating agents observed in a cross section of the dielectric layer, the acicular nucleating agents having lengths longer than a median value of the observed lengths are classified into a long nucleating agent group and the acicular nucleating agents having lengths shorter than the median value of the observed lengths are classified into a short nucleating agent group, in order to control a value obtained by dividing the average length of the acicular nucleating agents in the long nucleating agent group by the average length of the acicular nucleating agents in the short nucleating agent group (hereinafter, simply referred to as an average length ratio) within a specific range, it is necessary to consider the following.

Presence of a very long individual contained in the commercially available fiber material before processing increases the average length of the long nucleating agent group. When a mechanical stress is applied to such fiber material, the mechanical stress tends to initially act in a direction of decreasing the average length ratio. This is because, although depending on a type of mechanical stress, in many methods, breakage of a very long individual often proceeds preferentially over breakage of a short individual. However, when the breakage further progresses and the breakage of a very long individual approaches saturation, breakage of an individual having a medium length relatively increases. As a result, the number of short individuals is significantly increased, and the median value of the length decreases. Therefore, when the decrease in the median value is more significant than the decrease in the average length of the long nucleating agent group, the average length ratio may be increased again.

Further, a relation between a strength of the fiber material and the mechanical stress for breakage and distribution of the mechanical stress also affect the average length ratio.

An example of a breaking method using a Henschel mixer and a tumbler will be described below.

The Henschel mixer is a device that stores an object to be treated alone or simultaneously with other materials in a container provided with a metal blade, and mixes and stirs the object by rotating the metal blade. In breaking the fibrous material, the rotating metal blade can directly collide with the fibrous material, and thus the fibrous material can be effectively broken. In particular, the Henschel mixer is suitable for cases in which it is desired to reliably break a high-strength fibrous material.

On the other hand, in the entire object to be treated, a large stress is applied only to a local region that collides with the blade, and thus when a batch size of treatment is large, treatment unevenness may occur in a short time treatment. On the other hand, simply increasing a treatment time also results in the breakage of the fibrous material having a medium length, which may result in a larger average length ratio.

The tumbler is a device that stores an object to be treated alone or together with other materials in a container, and mixes and stirs the object by changing a direction of the container (i.e., a direction of gravity). When the tumbler is used for breaking the fibrous material, since a collision with the container or other contents in the container is breaking energy, the breakage of the fibrous material having extremely high mechanical strength is disadvantageous as compared with that of the Henschel mixer, but an advantage of limiting the breakage of the fibrous material is expected. Th tumbler is suitable for a fibrous material having a relatively low mechanical strength, and is also advantageous in increasing the batch size of treatment because it is easy to uniformly apply a breaking stress to the entire object in the container.

Therefore, by setting an appropriate processing condition according to a strength of the fibrous material to be applied, a batch size of treatment, and the like, a dielectric can be obtained in which acicular nucleating agents having a desired average length ratio are distributed.

For example, providing treatment (breakage) conditions set to predetermined conditions including preparation of a fibrous material having an average diameter of 1 μm or less and breakage of the fibrous material with a tumbler is indicated as an adjustment process for a nucleating agent for foaming having a preferred average length ratio. It is also effective to combine a treatment by a Henschel mixer as a pretreatment of the tumbler. Here, in the Henschel mixer, not only the breakage of the fibrous material but also an effect can be obtained in which variations in breakage of the fibrous material due to the tumbler are reduced by releasing aggregation of the fibrous material. Therefore, even when the applied fibrous material is significantly aggregated, a stable average length ratio is easily obtained.

Adjustment to the length distribution of the nucleating agent is not limited to the above. For example, after a nucleating agent group having a wide distribution is adjusted, a nucleating agent group having a desired length distribution can be extracted by a known method such as classification.

In any adjustment method, when, based on the observed lengths of the plurality of acicular nucleating agents observed in the cross section of the foamed dielectric layer of the finally obtained transmission line, the acicular nucleating agents having lengths longer than a median value of the observed lengths are classified into a long nucleating agent group and the acicular nucleating agents having lengths shorter than the median value of the observed lengths are classified into a short nucleating agent group, a transmission line having an excellent transmission characteristic can be obtained by setting an adjustment condition such that a ratio of an average length of the acicular nucleating agents in the long nucleating agent group to an average length of the acicular nucleating agents in the short nucleating agent group is a desired value.

The average length of the acicular nucleating agents in the long nucleating agent group is preferably 1.5 times or more the average length of the acicular nucleating agents in the short nucleating agent group. This is because, there is a possibility that when the fibrous material is broken until the ratio is 1.5 or less, a function of the nucleating agent is close to that of the granular nucleating agent, and an original effect of the acicular nucleating agent is reduced.

Next, the nucleating agents whose length distribution is adjusted as described above are dispersed in the resin. Here, as the resin serving as a dispersion medium of the acicular nucleating agent, a resin serving as a dielectric resin layer may be applied. In particular, since the fluororesin is a material having a low dielectric constant, a dielectric layer of a transmission line having an excellent transmission characteristic can be formed. Preferred examples of the fluororesin include thermoplastic fluororesins such as a tetrafluoroethylene-alkyl vinyl ether copolymer such as a tetrafluoroethylene-hexafluoropropylene copolymer and a tetrafluoroethylene-perfluoropropyl vinyl ether copolymer, an ethylene-tetrafluoroethylene-perfluorobutylethylene copolymer, an ethylene-chlorotrifluoroethylene copolymer, and a polyvinylidene fluoride. A melt flow rate (MFR) of these resins is preferably 10 g/10 min or more and 40 g/10 min or less, and particularly preferably 20 g/10 min or more and 30 g/10 min or less. The melt flow rate can be adjusted by selecting a grade of a material resin or mixing resins having appropriate grades.

The dispersion of the acicular nucleating agent in the resin can be carried out by kneading a mixture of the acicular nucleating agent and the resin with a mixer or the like. When the kneaded mixture of the acicular nucleating agent and the resin is formed as a resin piece called a pellet, storage stability and usability in a downstream process can be improved.

It is considered that the length distribution of the acicular nucleating agent changes also in a dispersion process, a pelletization process, or a foamed resin layer forming process described later. Even in such a case, a stress applied to the nucleating agent may be adjusted in each process such that the observed length in the transmission line has a predetermined length distribution. However, since it is more difficult to directly control the length distribution in later processes, the acicular nucleating agent is preferably adjusted to be in a state close to the necessary length distribution in a process as upstream as possible.

Next, a foamed resin layer is formed. When the transmission line is configured to include a central conductor and a foamed resin layer provided around the central conductor, the resin layer is preferably formed by extrusion. In a mold, a forming resin layer can be a foamed resin layer by injecting a high-pressure gas into the resin in which the pellet is melted and then reducing a pressure applied to a molten resin layer. Alternatively, a foamable substance that generates a gas by a chemical reaction or thermal decomposition may be mixed into the pellet or the resin in which the pellet is melted, and the generated gas may be foamed.

Although not limited thereto, the transmission line 10 according to the present embodiment can be obtained by the above processes. When the transmission line 10 is a coaxial cable, formation of an outer conductor and formation of an outer sheath can be performed following the above processes. The outer conductor can be formed by winding a metal foil around a core or forming a braid of a thin metal wire. Either one of a metal foil wound layer and a thin metal wire braided layer may be formed, or both may be formed.

EXAMPLES

Each transmission line having the configuration illustrated in Table 1 was produced, and the observed length and the dielectric constant of the acicular nucleating agent were measured. A single copper wire was used as the central conductor. In Comparative Example 1, as a raw material nucleating agent, a commercially available whisker (Arborex Y manufactured by SHIKOKU KASEI) made from aluminum borate, in which a long nucleating agent is relatively likely to remain even after various processes, was applied. Although the conditions are such that the aggregation is sufficiently released and the dispersibility can be secured, the control of the length distribution such as limitation of the average length of the long nucleating agent group is not particularly performed, and a pellet made from a mixture with a fluororesin is prepared. On the other hand, in Examples 1, 2, and 3, commercially available whiskers (TISMO D manufactured by Otsuka Chemical Co., Ltd.), which are considered to have the same mechanical characteristics as those of the whisker described above, but whose diameters are slightly smaller and whose length distribution can be relatively easily controlled, were applied. Such a nucleating agent having an average diameter smaller than 1 μm is particularly suitable for the present embodiment because the length distribution is easily controlled. In Examples 1, 2, and 3, conditions for not only releasing the aggregation and improving the dispersibility but also clearly changing the length distribution were applied. Although there was no extreme difference in the average length of the nucleating agents as a whole, an acicular nucleating agent group in which the average length of the long nucleating agent group was limited as compared with that in the comparative example was prepared, and a pellet made from a mixture of the prepared acicular nucleating agent group and a fluororesin was formed. A tetrafluoroethylene-hexafluoropropylene copolymer was used as the fluororesin.

TABLE 1

| | Central conductor diameter (mm) | Dielectric thickness (mm) | Addition amount of nucleating agent (weight %) | Average length ratio of nucleating agent group | Relative dielectric constant |
|---|---|---|---|---|---|
| Example 1 | 0.404 | 0.35 | 0.4 | 2.5 | 1.42 |
| Example 2 | 0.724 | 0.62 | 0.4 | 2.7 | 1.42 |

TABLE 1-continued

| | Central conductor diameter (mm) | Dielectric thickness (mm) | Addition amount of nucleating agent (weight %) | Average length ratio of nucleating agent group | Relative dielectric constant |
|---|---|---|---|---|---|
| Example 3 | 0.404 | 0.35 | 0.25 | 2.7 | 1.42 |
| Comparative Example 1 | 0.404 | 0.35 | 0.25 | 4.7 | 1.44 |

A dielectric layer was formed on the central conductor using each of the pellets. The dielectric layer was formed by extruding a resin in which the pellet is melted from an ejection hole of an extrusion mold and cooling the resin. Cable-like cores were continuously formed by running thin metal wires serving as central conductors in the same direction as ejection of the resin from the same ejection hole. Nitrogen gas was injected into the molten resin in the mold, and formation of the dielectric layer on the conductor and formation of bubbles in the dielectric layer were simultaneously performed by utilizing a pressure drop around the resin immediately after the resin was ejected from the ejection hole.

A static capacitance of the cable-like core thus obtained was measured using a capacitance monitor, a dielectric constant ε was calculated based on the following Equation 1, and a relative dielectric constant was obtained from a value of the dielectric constant ε.

$$\varepsilon = (C \times \log(D/d))/24.16 \quad \text{Equation 1}$$

Here, C is a static capacitance per meter (pF), D is an outer diameter of the core (mm), and d is a diameter of the central conductor (mm).

(Measurement of Observed Length)

After the dielectric layer of the core was cut out, a dielectric layer including a cross section to be an observation sample was prepared. The cross section of the observation sample may be formed by using a general sample preparation method such as cutting and polishing or a microtome. However, from an advantage in that change in a foamed state of the resin layer is small, a method of cleaving by mechanically breaking the cut dielectric layer while cooling the dielectric layer with liquid nitrogen or the like is preferred.

The obtained cross section was observed using a tabletop microscope (TM 4000 PLUS, manufactured by Hitachi High-Technologies Corporation). An observation magnification can be appropriately selected in a range of 500 times to 2500 times according to a state of a sample to be observed.

A rectangular region was randomly set in the obtained electron microscope image, and all acicular nucleating agents entirely contained in the rectangular region were measured. However, there is a possibility that the nucleating agent observed as being extremely small here is a granular nucleating agent generated in the adjustment stage of the length distribution or the like, and such granular nucleating agent cannot be expected to have a bubble control effect unique to the acicular nucleating agent. Further, depending on the observation magnification and sharpness of the image, a measurement error of the observed length may increase, and reproducibility may decrease, and thus a lower limit value was determined and excluded from measurement or calculation. For example, in the range of the observation magnification, the distribution of the acicular nucleating agent can be accurately understood by excluding the observed length of each nucleating agent in the longitudinal direction on the image of less than 1 μm from the calculation. In this example, the nucleating agent whose size of a major axis was clearly smaller than 1 μm was excluded from the measurement, the observed length was measured for the nucleating agent whose size of the major axis was in a vicinity of 1 μm, and the nucleating agent with a result of less than 1 μm was excluded before the calculation of the median and the average length.

In order to understand the distribution, it is preferable to secure the number of pieces of data of the observed length for each level. In the present embodiment, the number of pieces of data used to calculate the median and the average length is ensured to be 28 to 80 or more depending on the level. When the variation in observed length is large, it is preferable to further increase the number of pieces of data. An accurate distribution can be understood by securing the number of pieces of data at least 28, preferably 80 or more. When a distribution density of the nucleating agent is small and it is difficult to secure the necessary number of pieces of data, the observation region may be enlarged or added.

The median value, the average observed length of the long nucleating agent group, and the average observed length of the short nucleating agent group at each level were calculated using the data of the observed length acquired as described above, and the average observed length of the long nucleating agent group was divided by the average observed length of the short nucleating agent group to acquire an average length ratio of the nucleating agent group at each level.

The length ratio indicates a distribution state of the long acicular nucleating agent in the plurality of acicular nucleating agents, and it can be determined that in the acicular nucleating agent having a large length ratio, the long acicular nucleating agent is in a relatively large state in a population.

The calculated length ratio and relative dielectric constant are illustrated in Table 1. In Comparative Example 1 in which the length distribution was not controlled, the average length ratio of the nucleating agent group was as large as 4.7, and the relative dielectric constant of the obtained core was also as relatively large as 1.44. In contrast, in each of the examples in which the average length ratio of the nucleating agent group was limited to 3.5 times or less, it is confirmed that a core having a low relative dielectric constant can be stably formed.

Although the invention has been described in detail with reference to specific embodiments, it is apparent to those skilled in the art that various changes and modifications can be made without departing from the spirit and scope of the invention.

REFERENCE SIGNS LIST

10: transmission line; 20: central conductor, 30: dielectric layer; 40: core; 320: bubble; 330: acicular nucleating agent; 340: resin layer.

The invention claimed is:

1. A transmission line comprising a conductor and a dielectric layer, wherein
    the dielectric layer includes a plurality of bubbles and a plurality of acicular nucleating agents, and
    when, based on observed lengths of the plurality of acicular nucleating agents observed in a cross section of the dielectric layer, the acicular nucleating agents having lengths longer than a median value of the observed lengths are classified into a long nucleating agent group and the acicular nucleating agents having lengths shorter than the median value of the observed lengths are classified into a short nucleating agent group, an average length of the acicular nucleating agents in the long nucleating agent group is 3.5 times or less an average length of the acicular nucleating agents in the short nucleating agent group.

2. The transmission line according to claim 1, wherein the average length of the acicular nucleating agents in the long nucleating agent group is 3 times or less the average length of the acicular nucleating agents in the short nucleating agent group.

3. The transmission line according to claim 1, wherein the average length of the acicular nucleating agents in the long nucleating agent group is 1.5 times or more the average length of the acicular nucleating agents in the short nucleating agent group.

4. The transmission line according to claim 1, further comprising an outer conductor formed around the dielectric layer, and an outer sheath formed around the outer conductor.

5. The transmission line according to claim 1, wherein the dielectric layer contains a fluororesin.

6. The transmission line according to claim 1, wherein the acicular nucleating agents are insulators made from a metal compound or a ceramic material.

7. The transmission line according to claim 1, wherein an average diameter of the acicular nucleating agents is smaller than 1 μm.

8. The transmission line according to claim 1, wherein the acicular nucleating agents comprises an acicular nucleating agent having an aspect ratio of 3 or more.

9. The transmission line according to claim 1, wherein the acicular nucleating agents comprises an acicular nucleating agent having an aspect ratio of 6 or more.

10. The transmission line according to claim 1, wherein the acicular nucleating agents have a length distribution adjusted by breaking raw material nucleating agents having large aspect ratios.

* * * * *